United States Patent
Kishida

(10) Patent No.: US 9,216,615 B2
(45) Date of Patent: Dec. 22, 2015

(54) WHEEL MOUNTING BOLT AND WHEEL MOUNTING STRUCTURE

(71) Applicant: KYO-EI INDUSTRIAL CORPORATION, Osaka (JP)

(72) Inventor: Daisaku Kishida, Osaka (JP)

(73) Assignee: KYO-EI INDUSTRIAL CORPORATION, Osaka (JP)

( * ) Notice: Subject to any disclaimer, the term of this patent is extended or adjusted under 35 U.S.C. 154(b) by 2 days.

(21) Appl. No.: 14/257,009

(22) Filed: Apr. 21, 2014

(65) Prior Publication Data

US 2014/0363255 A1 Dec. 11, 2014

(30) Foreign Application Priority Data

Jun. 5, 2013 (JP) ................................. 2013-118614

(51) Int. Cl.
*A47G 3/00* (2006.01)
*B60B 27/06* (2006.01)
*B60B 3/16* (2006.01)
(Continued)

(52) U.S. Cl.
CPC ............... *B60B 27/065* (2013.01); *B60B 3/165* (2013.01); *F16B 5/0275* (2013.01); *F16B 37/14* (2013.01); *B60B 2900/3312* (2013.01); *B60B 2900/3318* (2013.01); *B60B 2900/572* (2013.01); *B60Y 2200/11* (2013.01); *F16B 2037/007* (2013.01)

(58) Field of Classification Search
CPC .. F16B 23/00; F16B 23/0007; F16B 23/0046; F16B 23/145; B60B 3/165; B60B 27/065; A47G 3/00

USPC ........... 411/372.5, 372.6, 373, 374, 383, 389, 411/424, 429
See application file for complete search history.

(56) References Cited

U.S. PATENT DOCUMENTS 4,480,513 A * 11/1984 McCauley et al. .............. 81/436
4,521,146 A * 6/1985 Wharton ........................... 411/1
(Continued)

FOREIGN PATENT DOCUMENTS

JP 2006-112605 4/2006
JP 2006-242221 A 9/2006
(Continued)

OTHER PUBLICATIONS

Japanese Office Action for corresponding JP Application No. 2013-118614, Mar. 24, 2015.
(Continued)

*Primary Examiner* — Roberta Delisle
(74) *Attorney, Agent, or Firm* — Mori & Ward, LLP

(57) ABSTRACT

A wheel mounting bolt includes a male thread portion, a collar portion, an engagement portion, and a protruding shaft portion. The male thread portion has a first end portion and a second end portion opposite to the first end portion in an axial direction of the male thread portion to be threadedly engaged, from the first end portion, with a female thread portion of a hub. The collar portion is provided between the first end portion and the second end portion of the male thread portion to fit into a bolt insertion hole of a wheel. The engagement portion is provided at the second end portion of the male thread portion integrally with the male thread portion to be gripped by a fastening tool. The protruding shaft portion protrudes from the engagement portion toward a direction opposite to the first end portion and is provided with male threads.

8 Claims, 4 Drawing Sheets

(51) Int. Cl.
    *F16B 5/02* (2006.01)
    *F16B 37/14* (2006.01)
    *F16B 37/00* (2006.01)

(56) References Cited

U.S. PATENT DOCUMENTS

| | | | |
|---|---|---|---|
| 5,302,069 A * | 4/1994 | Toth et al. | 411/429 |
| 5,324,148 A * | 6/1994 | Notaro | 411/396 |
| 5,395,196 A * | 3/1995 | Notaro | 411/396 |
| 5,707,113 A * | 1/1998 | Russell | 301/37.375 |
| 6,053,681 A * | 4/2000 | Mattershead | 411/195 |
| 6,318,942 B1 * | 11/2001 | Wieczorek | 411/431 |
| 6,695,557 B2 * | 2/2004 | Hove et al. | 411/429 |
| 7,922,433 B2 * | 4/2011 | Ricciardo | 411/119 |
| 8,333,537 B2 * | 12/2012 | Rogers et al. | 411/8 |
| 2003/0068212 A1 | 4/2003 | Wilson | |

FOREIGN PATENT DOCUMENTS

| | | |
|---|---|---|
| JP | 2007-262498 A | 10/2007 |
| JP | 2009-103313 A | 5/2009 |

OTHER PUBLICATIONS

Japanese Office Action for corresponding JP Application No. 2013-118614, Oct. 7, 2014.

* cited by examiner

WHEEL MOUNTING BOLT AND WHEEL MOUNTING STRUCTURE

CROSS-REFERENCE TO RELATED APPLICATIONS

The present application claims priority under 35 U. S.C. §119 to Japanese Patent Application No. 2013-118614, filed Jun. 5, 2013, entitled "Wheel Mounting Bolt and Wheel Mounting Structure." The contents of this application are incorporated herein by reference in their entirety.

BACKGROUND OF THE INVENTION

1. Field of the Invention

The present invention relates to a wheel mounting bolt and a wheel mounting structure.

2. Description of the Related Art

Conventional wheel mounting structures for mounting a wheel on a hub come in two types: one is such that a bolt is provided on the hub side and the wheel is mounted on the hub by tightening the bolt with a wheel mounting nut; the other is such that a female thread portion is provided on the hub side and the wheel is mounted by securely inserting a wheel mounting bolt into the female thread portion (see, for example, Japanese Patent Application Laid Open JP 2006-112605-A).

SUMMARY OF THE INVENTION

According to one aspect of the present invention, a wheel mounting bolt includes a male thread portion, a collar portion, an engagement portion, and a protruding shaft portion. The male thread portion has a first end portion and a second end portion opposite to the first end portion in an axial direction of the male thread portion to be threadedly engaged, from the first end portion, with a female thread portion of a hub. The collar portion is provided between the first end. portion and the second end portion of the male thread portion to fit into a bolt insertion hole of a wheel. The engagement portion is provided at the second end portion of the male thread portion integrally with the male thread portion to be gripped by a fastening tool. The protruding shaft portion protrudes from the engagement portion toward a direction opposite to the first end portion and is provided with male threads.

According to another aspect of the present invention, a wheel mounting structure includes a plurality of wheel mounting bolts and a plurality of tubular cap members. The plurality of wheel mounting bolts each include a male thread portion, a collar portion, an engagement portion, and a protruding shaft portion. The male thread portion has a first end portion and a second end portion opposite to the first end portion in an axial direction of the male thread portion to be threadedly engaged, from the first end portion, with a female thread portion of a hub. The collar portion is provided between the first end portion and the second end portion of the male thread portion to fit into a bolt insertion hole of a wheel. The engagement portion is provided at the second end portion of the male thread portion integrally with the male thread portion to be gripped by a fastening tool. The protruding shaft portion protrudes from the engagement portion toward a direction opposite to the first end portion and is provided with male threads. The plurality of tubular cap members are each provided with a female thread portion on an inner peripheral surface of each of the plurality of tubular cap members. The female thread portion of each of the plurality of tubular cap members is threadedly engaged with the protruding shaft portion in a detachable manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
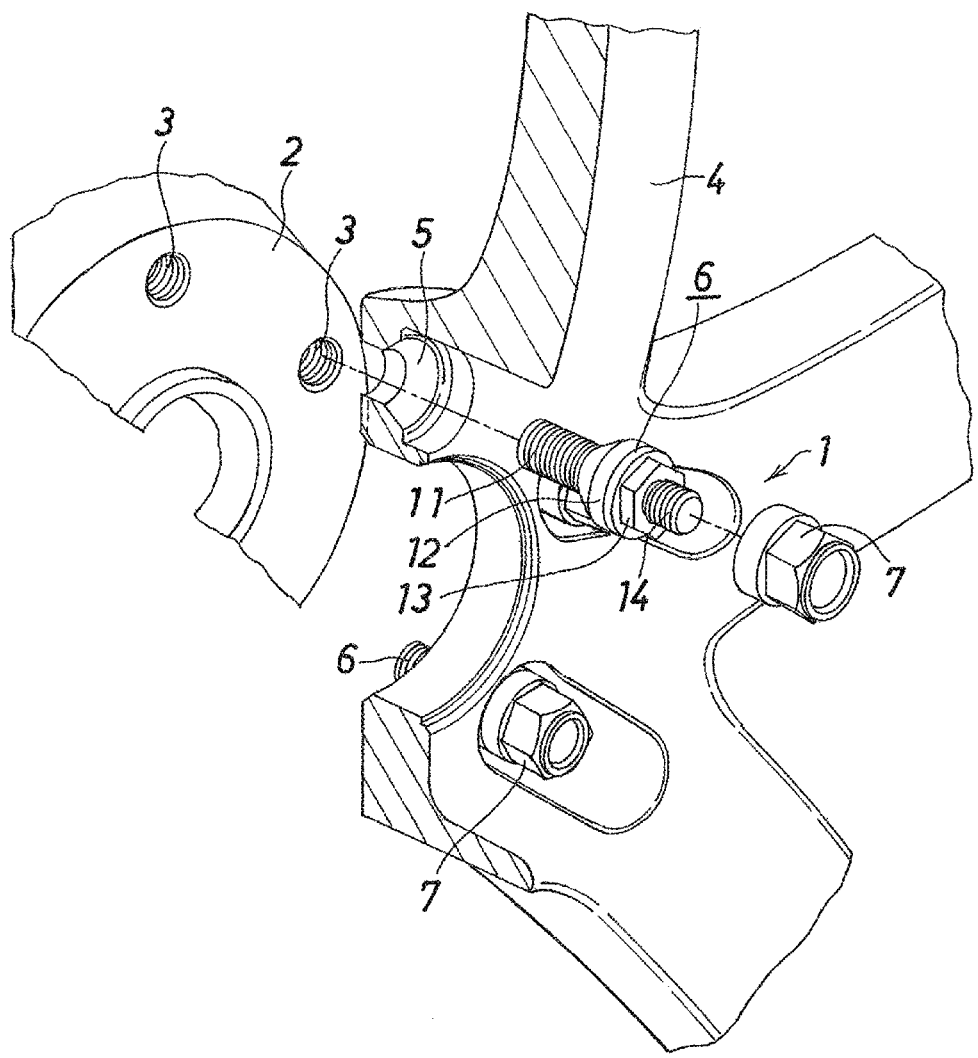
FIG. 1 is an exploded perspective view of a wheel mounting structure of an embodiment of the present invention.
Figure 2:
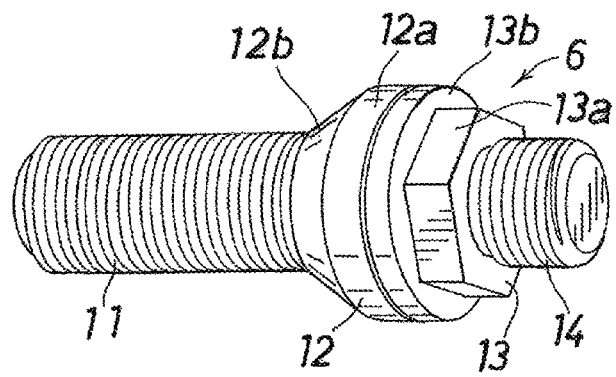
FIG. 2 is a perspective view showing the wheel mounting bolt of an embodiment of the present invention.

The embodiments will now be described with reference to the accompanying drawings, wherein like reference numerals designate corresponding or identical elements throughout the various drawings.

A description will be given below of embodiments of the present invention with reference to the accompanying drawings.

In the following description, a side closer to a hub 2 to which a wheel 4 is attached is referred to as a distal end; a side opposite to the distal end, i.e., a side closer to the operator who performs a wheel mounting operation, is referred to as a base end.

As shown in FIG. 1, a wheel mounting structure 1 is intended to mount an automobile wheel 4 on a hub 2 provided with a plurality of (about four to six) female thread portions 3, and the wheel mounting structure 1 comprises a plurality of wheel mounting bolts 6 and a plurality of cap members 7 to be mounted detachably on the respective bolts 6.

The bolt 6 has a first male thread portion (a male thread portion) 11 to be threadedly engaged with the female thread portion 3 of the hub 2; a collar portion 12 to fit into a bolt insertion hole 5 of the wheel 4; an engagement portion 13 to be gripped by a fastening tool such as a hexagonal wrench in order to threadedly engage the first male thread portion 11 with the female thread portion 3 of the hub 2; and a second male thread portion (a protruding shaft portion provided with male threads) 14 extending from the engagement portion 13 toward the opposite side of the first male thread portion 11.

The first male thread portion 11, the engagement portion 13, and the second male thread portion 14 are formed integrally. The second male thread portion 14 is relatively shorter and has a relatively smaller diameter than the first male thread portion 11.

The collar portion 12 is composed of a cylindrical portion 12a having a cylindrical surface on its outer peripheral surface, and a frustoconical portion 12b that is continuous with the distal end of the cylindrical portion 12a and has a frustoconical surface on its outer peripheral surface. The collar portion 12 is formed separately from the first male thread portion 11, the engagement portion 13, and the second male thread portion 14. The collar portion 12 is fitted around the first male thread portion 11 rotatably and inseparably.

Figure 3:
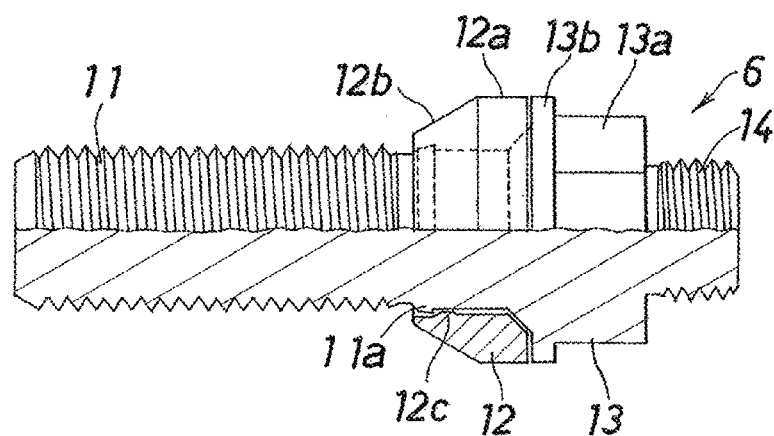
FIG. 3 is a cutting-into-half cross sectional view of the wheel mounting bolt shown in FIG. 2.

As shown in FIG. 3, the collar portion 12 is provided on an inner periphery thereof with an annular inwardly-protruding portion 12c, and the first male thread portion 11 is provided on an outer periphery of the base end thereof with an annular outwardly-protruding portion 11a. The outwardly protruding portion 11a engages with the inwardly-protruding portion 12c whereby the collar portion 12 is prevented from slipping off. The size of the inwardly-protruding portion 12c and the outwardly-protruding portion 11a are such that the collar portion 12 may be forcibly fitted around the first male thread portion 11 from its distal end.

The collar portion 12 is rotatable whereby the radial runout of the wheel is prevented and the bolt 6 is not readily loosened. By altering the outer peripheral shape of the collar portion 12 according to the shape of the bolt insertion hole 5 formed in the wheel 4 to make the collar portion 12 a ring member having not only the tapered shape but also various shapes, the wheel mounting bolt 6 may be adapted to various wheels without alteration of the first male thread portion 11, the engagement portion 13, and the second male thread portion 14.

The engagement portion 13 is composed of a hexagonal column portion 13a capable of being gripped by a fastening tool such as a hexagonal wrench, and a disk portion 13b provided integrally with the distal end of the hexagonal column portion 13a. The outer diameter of the disk portion 13b is greater than the outer diameter (the circumscribed circle diameter) of the hexagonal column portion 13a.

The first male thread portion 11, the collar portion 12, and the engagement portion 13 are essential components to fix the wheel 4. The wheel 4 is fixed to the hub 2 by threadedly inserting the first male thread portion 11 into the female thread portion 3 of the hub 2, gripping the hexagonal column portion 13a of the engagement portion 13 with use of a fastening tool to turn the bolt 6 till the collar portion 12 is fitted into the bolt insertion hole 5 of the wheel 4, and further turning the bolt 6 to tighten up the bolt 6.

The second male thread portion 14 is exposed from the wheel 4 toward the base end side with the wheel 4 fixed to the hub 2, and the cap member 7 is attached to the second male thread portion 14.

Figure 4:
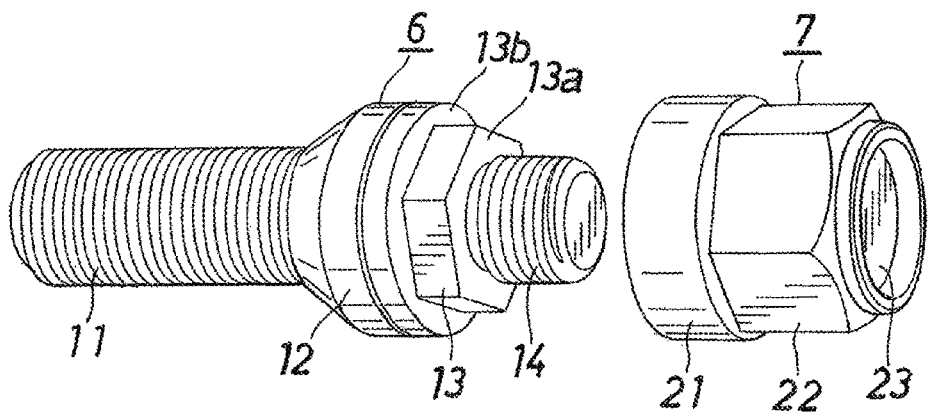
FIG. 4 is a perspective view showing an embodiment of a cap member.
Figure 5:
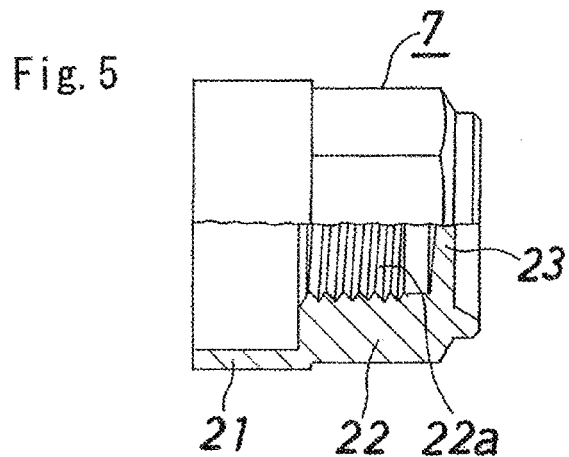
FIG. 5 is a cutting-into-half cross sectional view of the cap member shown in FIG. 4.

The cap member 7 has a cap-nut shape. As shown in FIGS. 4 and 5, the cap member 7 has a cylindrical portion 21 covering an outer peripheral surface of the engagement portion 13 of the wheel mounting bolt 6; an engagement portion 22 continuous with the base end of the cylindrical portion 21, the engagement portion 22 being to be gripped by a fastening tool such as a hexagonal wrench; and a closure portion 23 closing an opening of the engagement portion 22 on a base end thereof.

The outer diameter of the cylindrical portion 21 is equal to that of the disk portion 13b of the engagement portion 13 of the wheel mounting bolt 6; the inner diameter of the cylindrical portion 21 is greater than the outer diameter of the hexagonal column portion 13a of the engagement portion 13 of the wheel mounting bolt 6.

The engagement portion 22 is provided on an inner peripheral surface thereof with female threads 22a that accommodate the second male thread portion 14 of the wheel mounting bolt 6. The outer peripheral surface of the engagement portion 22 has a hexagonal shape in cross section whereby the cap member is turned by a fastening tool such as a hexagonal wrench.

Figure 6:
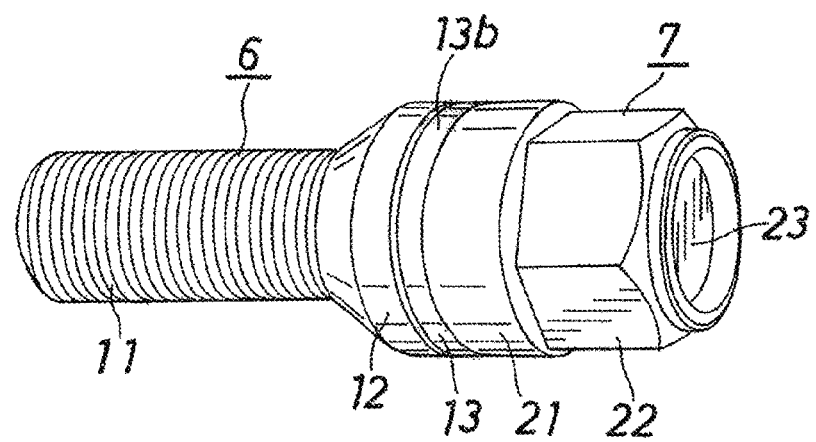
FIG. 6 is a perspective view of the wheel mounting bolt of an embodiment of the present invention with the cap member attached thereto.
Figure 7:
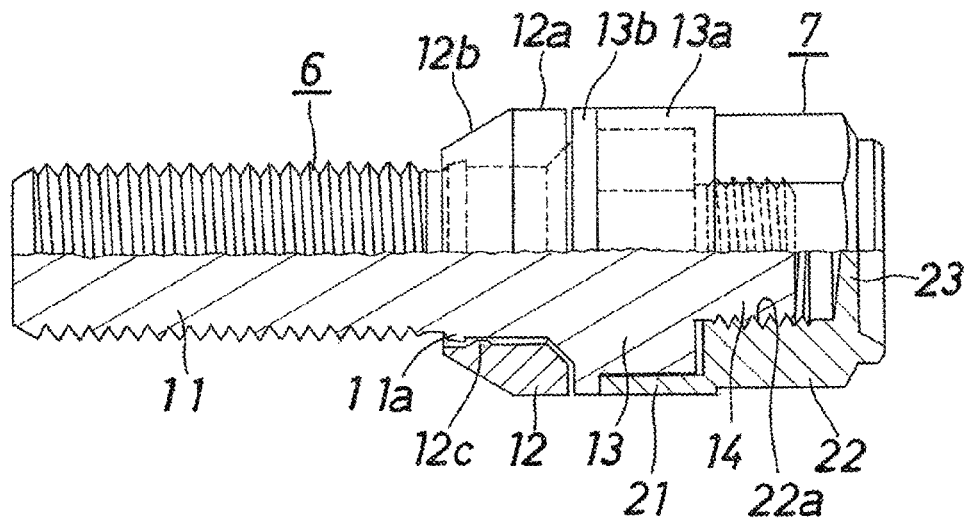
FIG. 7 is a cutting-into-half cross sectional view of the wheel mounting bolt and the cap member shown in FIG. 6.

As shown in FIGS. 6 and 7, when the female threads 22a formed on the inner peripheral surface of the engagement portion 22 of the cap member 7 are threadedly engaged with the second male thread portion 14 of the bolt 6, the distal end surface of the cylindrical portion 21 of the cap member 7 comes into contact with the disk portion 13b of the engagement portion 13 of the bolt 6, and the hexagonal column portion 13a of the engagement portion 13 and the second male thread portion 14 of the bolt 6 are covered by the cap member 7. With this configuration, the second male thread portion 14 and the hexagonal column portion 13a of the engagement portion 13 is protected by the cap member 7, while the appearance of the structure is improved because only the cap member 7 is exposed on the base-end-side surface of the wheel 4.

Figure 8:
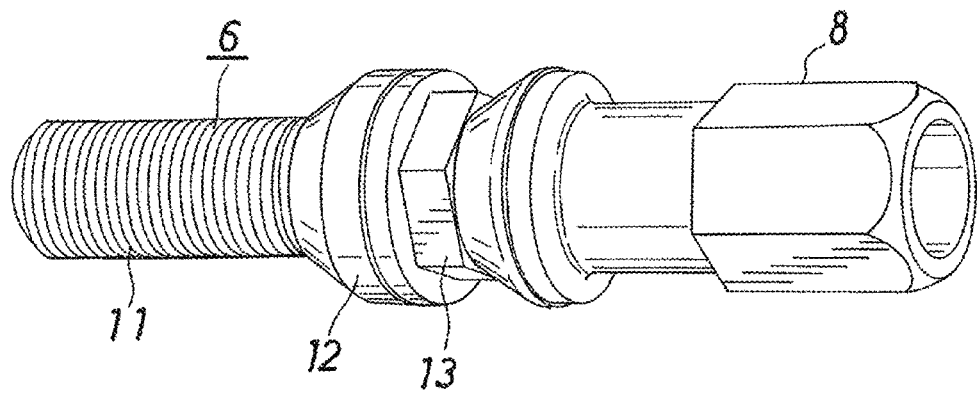
FIG. 8 is a perspective view of the wheel mounting bolt of an embodiment of the present invention with another cap member attached thereto.

The cap member 7 is easily detachable and it is therefore easy to remove the cap member 7 as shown in FIGS. 4 and 5 and to replace it with different types of the cap member 7. As shown in FIG. 8, the different type of the cap member 7 includes a nut 8 that is used to mount the wheel 4 on the hub provided with a plurality of male thread portions and is made of, for instance, chromium molybdenum steel having excellent strength.

Figure 9A:
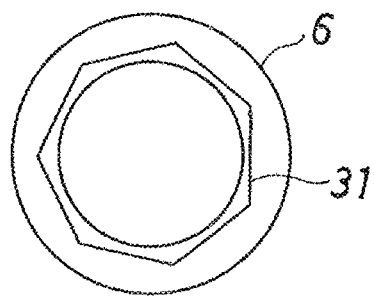
FIGS. 9A to 9C are front elevational views showing other engagement portions of the wheel mounting bolt of an embodiment of the present invention.
Figure 9B:
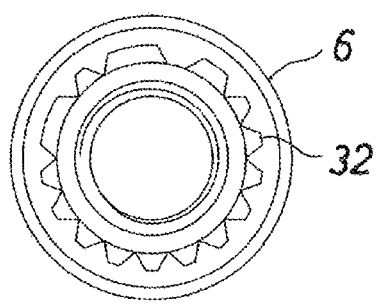
Figure 9C:
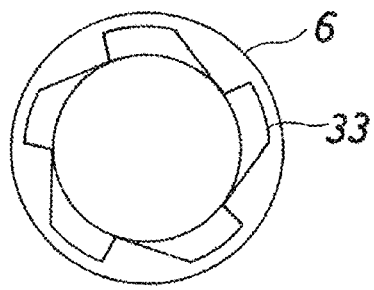

In the above-mentioned case, the engagement portion 13 of the bolt 6 is not limited to the hexagonal column in shape. It may be a heptagonal engagement portion 31 as shown in FIG. 9A, may be an engagement portion 32 in which convexities are formed irregularly as shown in FIG. 9B, or may be an engagement portion 33 having a screw-propeller shape in which an edge of each of blades is obliquely inclined as shown in FIG. 9C. Because the engagement portions 31, 32, 33 have a modified cross sectional shape such as a heptagonal shape, the wheel mounting bolt 6 cannot be fastened or removed by a general-purpose fastening tool such as a hexagonal wrench. This means that only those who have a special tool can fasten or remove the wheel mounting bolt 6 whereby this antitheft wheel mounting structure 1 prevents the wheel 4 from being stolen.

The shape of the outer peripheral surface of the engagement portion 22 of the cap member 7 may also be heptagonal as shown in FIG. 9A, may be such that convexities are formed irregularly as shown in FIG. 9B, or may be a screw propeller in which an edge of each of blades is obliquely inclined as shown in FIG. 9C.

According to a first aspect of the embodiment of the present invention, there is provided a wheel mounting bolt for mounting a wheel on a hub provided with a plurality of female thread portions. The bolt has: a male thread portion to be threadedly engaged with the female thread portion of the hub; a collar portion to fit into a bolt insertion hole of the wheel; an engagement portion formed integrally with a base end of the male thread portion, the engagement portion being to be gripped by a fastening tool; and a protruding shaft portion protruding from the engagement portion, the protruding shaft portion being provided with male threads.

The wheel mounting bolt is made of the same material as conventional wheel mounting bolts or of materials with a strength greater than that of the conventional wheel mounting bolts (for example, materials made of chromium molybdenum steel subjected to nitriding treatment), since the strength (in particular fatigue strength) of the bolt is considered as important. As in the conventional structure, the wheel is fixed to the hub by threadedly inserting the bolt from a distal end thereof into the female thread portion of the hub, gripping the engagement portion of the bolt with use of a fastening tool, and then turning the bolt with the fastening tool until the bolt is engaged completely with the female thread portion of the hub.

The protruding shaft portion is an unnecessary portion to fix the wheel to the hub. But, since the protruding shaft portion is provided with male threads, a cap member provided with female threads, serving for instance as an accessory, can be attached to the protruding shaft portion. Since the material, shape, and colour of the cap member are not specifically limited as long as the cap member is provided with female threads, the cap member can have various functions including a decorative function.

Preferably, the collar portion is a member separate from the male thread portion and is attached rotatably in a relative manner to the male thread portion.

With this configuration, the radial runout of the wheel and the loosening of the bolt are advantageously prevented. In addition, by altering the outer peripheral shape of the collar portion according to the shape of the bolt insertion hole formed in the wheel, the wheel mounting bolt may be adapted to various wheels without altering the shape of the bolt except for that of the collar portion.

According to a second aspect of the embodiment of the present invention, there is provided a wheel mounting structure for mounting a wheel on a hub provided with a plurality of female thread portions. The structure includes: a plurality of wheel mounting bolts, each of the wheel mounting bolts being the wheel mounting bolt according to the first aspect of the embodiment of the present invention; and a plurality of tubular cap members, each of the cap members being provided on an inner peripheral surface thereof with a female thread portion, the female thread portion of the cap member being threadedly engaged with the protruding shaft portion of each of the wheel mounting bolts in a detachable manner.

Since the cap member is not required to have a wheel mounting function (strength), decorativeness may be improved by forming the cap member from, for example, a coloured aluminium alloy. For instance, forming the cap member from chromium molybdenum steel (SCM 435 stipulated in the Japanese Industrial Standards (JIS)), gives the cap member improved strength and decorativeness at the same time.

The strength of the wheel mounting bolt may be greater than that of the cap member. For example, the wheel mounting bolt may be made of steel and the cap member may be made of a coloured aluminium alloy.

The steel is not specifically limited but chromium molybdenum steel is preferable since it demonstrates excellent strength. Colouring of the cap member may be performed, for example, by anodic oxidation.

Preferably, the cap member has a cylindrical portion covering an outer peripheral surface of the engagement portion of the wheel mounting bolt; an engagement portion continuous with the cylindrical portion, the engagement portion being provided on an inner peripheral surface thereof with a female thread portion, the engagement portion being to be gripped by a fastening tool; and a closure portion closing an opening of the engagement portion of the cap member.

With this configuration, the engagement portion of the wheel mounting bolt is covered by the cap member whereby the wheel mounting bolt is protected. In addition, since only the cap member is to be exposed outside the wheel, excellent decorativeness may be obtained by taking advantage of the design of the cap member.

At least one of the engagement portion of the wheel mounting bolt and the engagement portion of the cap member may have a non-hexagonal modified cross sectional shape.

With this configuration, general-purpose tools such as hexagonal wrenches cannot be used to turn the wheel mounting bolt. This means special tools are required whereby an anti-theft function is obtained.

According to the wheel mounting bolt of the embodiment of the present invention, since the male threads are formed on the protruding shaft portion that protrudes from the engagement portion, the cap member may be attached to the male threads. The material, shape, and colour of the cap member are not specifically limited as long as the cap member is provide with female threads, and therefore a cap member having a function for instance as an accessory may be used whereby various functions including a decorative function may be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A wheel mounting bolt comprising:
   a male thread portion having a first end portion and a second end portion opposite to the first end portion in an axial direction of the male thread portion to be threadedly engaged, from the first end portion, with a female thread portion of a hub;
   a collar portion provided between the first end portion and the second end portion of the male thread portion to fit into a bolt insertion hole of a wheel;
   an engagement portion provided at the second end portion of the male thread portion integrally with the male thread portion as a one-piece unitary member to be gripped by a fastening tool; and
   a protruding shaft portion protruding from the engagement portion toward a direction opposite to the first end portion and provided with male threads.

2. The wheel mounting bolt according to claim 1, wherein the collar portion is a member separate from the male thread portion and is attached rotatably in a relative manner to the male thread portion, and
   wherein the collar portion is provided on an inner periphery thereof with an annular inwardly-protruding portion, the male thread portion is provided on an outer periphery of a base end thereof with an annular outwardly-protruding portion, the outwardly protruding portion engages with the inwardly-protruding portion such that the collar portion is prevented from slipping off, and a size of the inwardly-protruding portion and the outwardly-protruding portion are such that the collar portion is forcibly fitted around the male thread portion from a distal end of the male thread portion.

3. The wheel mounting bolt according to claim 1, wherein the protruding shaft portion is shorter than and has a smaller diameter than the male thread portion.

4. A wheel mounting structure comprising:
   a plurality of wheel mounting bolts each comprising:
      a male thread portion having a first end portion and a second end portion opposite to the first end portion in an axial direction of the male thread portion to be threadedly engaged, from the first end portion, with a female thread portion of a hub;
      a collar portion provided between the first end portion and the second end portion of the male thread portion to fit into a bolt insertion hole of a wheel;

an engagement portion provided at the second end portion of the male thread portion integrally with the male thread portion as a one-piece unitary member to be gripped by a fastening tool; and a protruding shaft portion protruding from the engagement portion toward a direction opposite to the first end portion and provided with male threads; and a plurality of tubular cap members each provided with a female thread portion on an inner peripheral surface of each of the plurality of tubular cap members, the female thread portion of each of the plurality of tubular cap members being threadedly engaged with the protruding shaft portion in a detachable manner.

5. The wheel mounting structure according to claim 4, wherein a strength of the plurality of wheel mounting bolts is greater than a strength of the plurality of tubular cap members.

6. The wheel mounting structure according to claim 5, wherein the plurality of wheel mounting bolts are made of steel and the plurality of tubular cap members are made of coloured aluminium alloy.

7. The wheel mounting structure according to claim 6, wherein each of the plurality of tubular cap members has:

a cylindrical portion covering an outer peripheral surface of the engagement portion of each of the plurality of wheel mounting bolts;

an engagement portion continuous with the cylindrical portion, the engagement portion being provided on an inner peripheral surface of the engagement portion with a female thread portion, the engagement portion being to be gripped by a fastening tool; and a closure portion closing an opening of the engagement portion of each of the plurality of tubular cap members.

8. The wheel mounting structure according to claim 4, wherein at least one of the engagement portion of each of the plurality of wheel mounting bolts and the engagement portion of each of the plurality of tubular cap members has a non-hexagonal modified cross sectional shape.

* * * * *